United States Patent [19]

Kerley, Jr.

[11] 4,269,622

[45] May 26, 1981

[54] RECOVERY OF PRECIOUS METALS FROM DIFFICULT ORES

[76] Inventor: Bernard J. Kerley, Jr., Santo Tomas Rt. Box 73, Sahuarita, Ariz. 85629

[21] Appl. No.: 108,168

[22] Filed: Dec. 28, 1979

[51] Int. Cl.³ ............................................. C22B 11/04
[52] U.S. Cl. ................................. 75/103; 75/101 R; 75/118 R; 75/121; 423/32; 423/33
[58] Field of Search .................... 75/103, 118 R, 121, 75/101 R; 423/32, 33

[56] References Cited

U.S. PATENT DOCUMENTS

| | | | |
|---|---|---|---|
| 295,815 | 3/1884 | Russell | 75/101 R |
| 295,816 | 3/1884 | Russell | 75/101 R |
| 296,709 | 4/1884 | Russell | 423/35 |
| 296,710 | 4/1884 | Russell | 423/37 |
| 320,590 | 6/1885 | Russell | 423/182 |
| 366,103 | 7/1887 | Hofmann | 423/27 |
| 381,849 | 4/1888 | Russell | 75/101 R |
| 1,627,582 | 5/1927 | Terry | 75/103 |
| 1,870,703 | 8/1932 | Allingham | 423/45 |
| 1,891,532 | 12/1932 | Gibson | 75/103 |
| 2,693,404 | 11/1954 | Mackiw | 423/32 |
| 2,822,263 | 2/1958 | Forward | 75/117 |
| 2,928,732 | 3/1960 | Bare et al. | 75/119 |
| 3,848,054 | 11/1974 | Wieriorowski | 423/140 |
| 3,953,200 | 4/1976 | Im | 75/103 |
| 3,983,017 | 9/1976 | Szabo | 75/117 X |
| 4,029,498 | 6/1977 | Okajima | 75/103 |
| 4,070,182 | 1/1978 | Genik-Sas-Berezowsky et al. | 75/103 |

*Primary Examiner*—G. Ozaki

[57] ABSTRACT

Precious metals such as gold and silver are recovered from difficult-to-treat ores, particularly those containing manganese, by lixiviating using an ammonium thiosulfate leach solution containing copper, sufficient ammonia to maintain a pH of at least 7.5, and at least 0.05% sulfite ion.

6 Claims, No Drawings

RECOVERY OF PRECIOUS METALS FROM DIFFICULT ORES

FIELD OF INVENTION

The present invention relates to the recovery of minerals from ores and, more particularly, to the extraction of precious metals by lixiviation, particularly from ores which are otherwise difficult to handle.

BACKGROUND OF THE INVENTION

Lixiviation is a technique used to extract a soluble component from a solid mixture by washing or percolation, i.e. leaching. World-wide present practice for extracting precious metals by lixiviation is carried out using cyanide solutions, mainly sodium cyanide. Because cyanides are so highly toxic, and because they cause substantial environmental problems, the use of cyanides is now falling into disfavor. Moreover, cyanides are costly materials which makes their use economically disadvantageous. Moreover, the use of cyanide solutions is at best difficult and at worst impossible with respect to some ores, especially those containing copper and/or manganese, since these materials easily contaminate the cyanide; and such materials are frequently present to the extent that poor recoveries of the precious metals are obtained using cyanide solutions.

Indeed, with respect to the last problem mentioned immediately above, there are many difficult-to-treat ores in existence which contain manganese and significant quantities of silver and/or gold, and from which it would be desirable to extract these precious metals, and if a suitable and sufficiently inexpensive technique existed for such recovery. However, present techniques are simply not adequate and these ores remain an untapped mineral resource.

Copper-bearing sulphur-containing ores, such as chalcopyrite, often contain small quantities of gold and silver which, desirably, should be recovered. Although the problem of recovering such precious metals, as well as the copper, has received considerable attention in the past, much of the work carried out in this connection, insofar as commerical processing is concerned, has involved the recovery of precious metals using pyrometallurgical processes for the recovery of the copper.

One attempt to solve the above identified problems is disclosed in the Genik-Sass-Berecowsky et al U.S. Pat. No. 4,070,182. This patent proposes the use of ammonium thiosulfate as a secondary leach for the recovery of silver and gold, in conjunction with a hydrometallurgical process for the recovery of copper from the copper-bearing sulphidic ore. FIG. 3 of this patent shows a flow diagram for the extraction of precious metals from chalcopyrite concentrate before the main leaching step for extraction of copper. However, this patent appears to provide no instruction as to how to maintain the thiosulphate radical stable, and does not even appear to recognize the problem of thiosulphate instability. This patent also does not clearly teach the necessity of maintaining an alkaline pH in the thiosulfate leach liquor when starting with a raw ore, although the need for an alkaline pH is mentioned in conjunction with thiosulfate extraction following a copper recovery leach. Furthermore, this patent provides no guidance with respect to the extraction of precious metals from difficult ores containing manganese.

SUMMARY OF THE INVENTION

It is, accordingly, an object of the instant invention to overcome deficiencies in the prior art, such as indicated above.

It is another object to provide for the improved extraction of precious metals from ores by lixiviation.

It is a further object to provide an improved process of extracting precious metals, such as gold and silver, by lixiviation, using an ammonium thiosulfate leach liquor.

It is yet another object of the instant invention to provide for the extraction of precious metals from difficult-to-treat ores, and particularly such ores containing copper and/or manganese, and most particularly such ores containing manganese.

It is yet a further object to provide a method for recovery of precious metals from an ore containing same, which method comprises lixiviating the precious metals, using an ammonium thiosulfate leach liquor at an alkaline pH and containing copper and sulfite ions.

These and other objects and the nature and advantages of the instant invention will be more apparent from the following detailed description of various embodiments, such detailed description being offered illustratively and not limitatively.

DETAILED DESCRIPTION OF EMBODIMENTS

In accordance with the instant invention, it has been found that the problems extant in the prior art, including those indicated above, are largely overcome by lixiviation in ammonium thiosulfate solutions containing copper and at least a trace of sulfite ions. With the use of such a leach liquor good recoveries are achieved in less time compared with the prior art use of cyanide, and without the possibility of contamination of streams and surroundings. Moreover, the process constitutes an improvement of the thiosulfate leaching of U.S. Pat. No. 4,070,182 by providing better control of the stability of the thiosulfate radical.

After the lixiviation has been completed, recovery of the precious metals from the leach liquor can be carried out in the same ways as are conventionally used for recovering such metals from cyanide solutions, namely by the use of metallic zinc, iron or copper; by electrolysis; or by the addition of soluble sulfides to recover a sulfide precipitate. The stripped ammonium thiosulfate solution is thereby rejuvenated and can be recycled for reuse in the instant process.

The present process is especially advantageous for the recovery of precious metals from difficult-to-treat ores, namely those which are contaminated by copper and/or manganese, less frequently arsenic, antimony, selenium, tellurium and possibly other base metals as well. Copper and manganese, and particularly manganese, are especially poisonous to cyanide solutions, and because thiosulfate is much less expensive, stronger leach solutions may be used, which will overcome the disadvantages of such poisons as manganese and lead. A particular problem exists with manganese ores, as many such ores presently exist which, under previous technology, are simply unusable. The instant invention overcomes the disadvantages of high manganese content, and good recoveries are obtained merely at the expense of the use of more reagent and, at times, maintaining a higher quantity of sulfite in the leach solution than would otherwise be needed in accordance with the instant invention.

In any lixiviation process, the strength of the leach solution is an important consideration. However, with cyanide lixiviation the high toxicity and the high cost of the chemical prohibit consideration of using more than about 1-2% solutions, thereby requiring long retention times and resultant large solution tanks. These problems are eliminated by the instant invention; thus, in the present invention ammonium thiosulfate, which is a relatively low cost and non-toxic material, can be used in much stronger solutions than is permissible with cyanide, namely as high as 60%. Solutions in the range of 12-25% are particularly satisfactory, it being understood that the higher the solution strength the less the time needed for completing the leaching. In some ores, as little as 2% ammonium thiosulfate gives adequate results.

An important aspect of the present invention is the inclusion of copper in the leach solution or lixiviation liquor. This, of course, presents no problem if the ore itself contains copper, such as the ores treated in accordance with U.S. Pat. No. 4,070,182. Some copper must be present for good recovery, and if the ore itself contains copper, this will most generally suffice. If not, a copper salt or copper containing ore should be added to supplement and maintain the concentration required for best results. In general, and consistent with U.S. Pat. No. 4,070,182, it has been found that a copper concentration of 1-4 g/l is desirable, although this will vary somewhat from ore to ore.

Another important requirement is to maintain the pH of the leach solution in the alkaline range, preferably at least 7.5 and most preferably at least 8. Ammonium hydroxide (ammonia titratable with dilute standard acid) is the preferred means for maintaining the desired pH. Available ammonia not only accelerates the rate of solution of the precious metal in the leach liquor, but also helps to stabilize the ammonium thiosulfate.

The presence of sulfite ions in the leach solution is an essential aspect of the invention. The sulfite ion is necessary to inhibit the decomposition of the thiosulfate which, if permitted to occur, would result in precipitation of silver sulfide with resultant loss of recovery. While the quantity of sulfite present need not be great, as noted below, it is essential that the sulfite be present throughout the lixiviation process. Quantities as little as trace amounts of sulfite will assure stability of the solution, but in view of the continuously changing conditions which inherently occur in the lixiviation process, it is desirable that the sulfite ion be present in a quantity of at least 0.05%. In the case were the ores being treated are refractory ores, in particular ores containing significant quantities of manganese, up to three or four percent, e.g. 1-4%, of sulfite ions are desirable to maintain stability of the ammonium thiosulfate.

Sulfite ions can be provided in a number of ways. The most direct is by simply adding ammonium sulfite or ammonium bisulfite to the leaching solution; other sulfite salts may also be used. In some cases it is desirable to maintain sulfite concentration by adding sulfur dioxide to the ammoniacal leach solution, but if this method is chosen, precaution must be taken to assure that the solution does not become acid and that the pH is preferably maintained at 8 or above, it being understood that sulphur dioxide is an acid source.

The importance of maintaining at least a trace of sulfite anion ($SO_3^{--}$) in the leaching liquor during lixiviation is important because without the presence of sulfite, the thiosulfate radical becomes unstable resulting in the production of sulfide and the precipitation of silver as represented by the following equation:

(1) $CaO + (Ag)_2S_2O_3 \rightarrow Ag_2S + CaSO_4$

This equation is representative of the irreversible reactions which take place not only in the presence of calcium oxide, but also with the oxides of iron, aluminum, manganese and copper; and such a reaction may even take place with ammonium hydroxide in the absence of the sulfite anion. The sulfite ion prevents the formation of any free divalent sulphur necessary for the formation and precipitation of silver, and automatic entrainment and loss of gold. In treating raw ores containing oxides of the metals listed above which serve to poison the extraction process, particularly manganese, the conditions are quite variable depending on the ore and thus it is essential to prevent decomposition of the thiosulfate following the general mechanism of formula (1) above. Maintaining at least a trace of sulfite ion, preferable at least 0.05% and most preferably 0.1-2% sulfite ion, has been found to stabilize the thiosulfate and thereby preventing precipitation of already dissolved precious metal.

An equilibrium reaction occurs in the thiosulfate leach liquor as represented by the following equation (2):

(2) $6H^+ + 4SO_3^= + 2S^= \rightleftharpoons 3S_2O_3^= + 3H_2O$

It is clear that without the sulfite ion being present, the equilibrium would move to the left, thereby producing divalent sulfide sulphur ($S^=$) which precipitates metal sulfides thereby losing them from the leaching solution. Equilibrium reaction (2) thereby readily illustrates the need for continued presence of some sulfite to drive the reaction (2) to the right thereby preventing the decomposition of the thiosulfate with loss of not only reagents but loss of values from the leaching solution.

Manganese containing precious metal ores have an unusually high requirement for sulfite ion, because of the oxydizing capability of various manganic compounds, especially prevalent among which is manganese oxide ($MnO_2$). This high requirement for sulfite is demonstrated by equation (3) below:

(3) $MnO_2 + 2(NH_4)_2SO_3 + 2H_2O \rightarrow MnS_2O_6 + 4NH_4OH$

The reaction demonstrated by equation (3) is beneficial with many ores, because the metals are in a complex combination with manganese, and such reaction serves to free the desirable metals from the manganese so that such desirable metals can then be lixiviated. However, the undesirable aspect of this reaction is that it consumes sulfite anion and it is therefore important that when acting on manganese containing ores in accordance with the present invention, special precautions be taken to assure the continued presence of sulfite thereby preventing equation (2) from going to the left with the resultant loss of these desired precious metals from the leaching solution.

The lixiviation is preferably carried out at a temperature of 40°-60° C., preferably 50°-60° C. Temperatures much greater than 60° C. make it difficult to retain the ammonium hydroxide content needed for best results.

Temperatures below 40° C. adversely affect the speed of the process, i.e. the time it takes for the desired precious metals to become solubilized is undesirably extended.

As noted above, after recovery of the dissolved precious metals, such as by precipitation from the leaching liquor, the ammonium thiosulfate containing liquor is desirably recycled for reuse. However, there are likely to be certain losses of chemicals, including thiosulfate, both due to side reactions and to mechanical losses. In such a case additional ammonium thiosulfate to make up for the losses is manufactured in situ by the reaction between extra sulfite, i.e. an amount of sulfite above and beyond that otherwise needed, and soluble sulfide. Thus, at the conclusion of the recovery stage, ammonium thiosulfate may be internally manufactured in the liquor by the addition of extra sulfite, either as ammonium sulfite, or sulphur dioxide and ammonia, and the addition to the filtered liquor of soluble sulfide, preferably as ammonium polysulfide or ammonium sulfide. Addition of the soluble sulfide will first precipitate metals from solution, and the remaining soluble sulfide will then react with sulfite present to produce the desired thiosulfate. This technique can be used to restore only the thiosulfate lost during the prior lixiviation and/or recovery stage, or it can be used to bring the solution to the desired strength. the mechanism of the reaction is according to equation (2), above.

The following examples will illustrate the manner in which the invention can be practiced. It is to be understood that the specific conditions set forth in the examples are not to be considered limiting to the invention.

EXAMPLE 1

A manganese containing ore from the State of Sonora, Mexico, in the Guereguito region, was obtained, the ore having the following assay: Gold 0.014 oz per ton; Silver, 12.1 oz. per ton; Manganese, 2.1%. This is a very difficult-to-treat ore, the owner having attempted for many years without success to have the ore commercially treated to recover the gold and silver.

The ore was split into seven equal parts of 500 grams each. The first 500 gram portion of the lot was ground fifteen minutes in a solution containing 200 grams of ammonium thiosulfate, 12 grams of ammonium sulfite, fifty grams of ammonium hydroxide, and sufficient water to bring the solution to ½ liter. After grinding in this solution, the slurry was transferred to a 2,000 ml beaker along with additional water, added while washing the mill, to bring the total to 1,200 cc. This was placed on a hotplate with stirring and the temperature raised and maintained while stirring to between 50° and 60° C. After one and one half hours of this heating and stirring, sufficient copper sulfate was added to make 4 grams per liter of copper in solution. Stirring and heating continued for an additional six hours, adding every hour an additional amount of ammonium hydroxide to maintain the volume at a total of 1,200 cc. At the end of this period the slurry was filtered and the solids washed twice with 250 cc of water, after which the solids were dried and sent for assay.

The solution from the above test was analyzed for free ammonia, ammonium thiosulfate and sulfite ion, as well as for precious metals content. Sufficient ammonium sulfide was added to this solution to precipitate the silver content only, according to the following equation:

$$Ag_2S_2O_3 + (NH_4)_2S \rightarrow Ag_2S + (NH_4)_2S_2O_3$$

If there is any lead in the solution which has been leached from the ore, it too would be precipitated along with the silver and therefore additional sulfide to precipitate the lead must be added in order to precipitate the silver. Some copper also precipitates and some silver will remain in the solution. However, if 80% of the silver is precipitated and the residual solution containing a little silver but most of the copper is recycled to the process, reagent costs are kept low.

After removing the silver precipitate, the leaching solution was recycled to the second 500 gram lot of ore, and the above procedure repeated adding only sufficient ammonium thiosulfate, ammonium sulfite and copper to maintain optimum strength of the solution. Anhydrous ammonia was used in all cycles subsequent to the first, instead of ammonium hydroxide, so as to be able to use more water and better wash the values from the leached solids.

For this series, the solution analysis was brought back with each cycle to the approximate analysis as follows:

| | |
|---|---|
| Ammonium thiosulfate | 18% |
| Ammonium sulfite | 3% |
| Ammonium hydroxide | 2% |
| Copper about 4 grams per liter | |

This process was continued as above for the seven cycles with an average of 93.2% recovery for the silver and 86.7% of the gold. Consumption was approximately eight pounds of ammonium thiosulfate and three pounds of ammonium sulfite per ton of ore. Copper loss was about a pound per ton.

It is therefore seen that excellent results were achieved demonstrating the successful and economical recovery of gold and silver from this difficult-to-treat manganese containing ore.

EXAMPLE 2

Six different "difficult" ores as identified in the tables below were split into duplicate 500 gram samples, and two series of lixiviations were carried out, each series with one of the duplicates from each of the six samples. The A series of samples were treated in accordance with the present invention with 180 grams of ammonium thiosulfate, plus 9 grams of ammonium sulfite, and 4 grams of copper (as copper sulfate) and made up with water to one liter of slurry. The B series were treated with precisely the same leaching liquor, except that no sulfite was used. The samples were all placed on a heated-agitator and 4 grams of copper were added to each slurry while injecting ammonia to bring the pH to 9.0 and the temperature to 50° C. Every two hours throughout the eight hour leaching, a sample was taken from the solution and in the case of the A series sufficient ammonium sulfite was added to maintain the sulfite analysis at about 1%. Ammonia was also added to maintain the pH above 7.5.

The results are given in the table below in which the identification of the ore is given in the left hand column with the gold and silver assays being presented in ounces per ton, and the other important ingredients are given in percent; gold and silver recoveries are reported in the two series.

It will be obvious to those skilled in the art that various changes may be made without departing from the scope of the invention and the invention is not to be considered limited to what is described in the specification.

| NAME AND ASSAY Au and Aq Oz/ton Others as percent | Solution | | Solids (Tails) | | Solution | | Solids (Tails) | |
|---|---|---|---|---|---|---|---|---|
| | % thio-sulfate | % Sulfite | Assay oz/t | Percent Recovery | % thio-sulfate | % sulfite | Assay oz/t | Percent Recovery |
| (1) Belmont Ore Au 0.002 Ag 10.10 Mn 22.4% | 18.4 | 1.3 | 0.002 Au 1.80 Ag | None Au 82.2% Ag | 17.3 | Nil | 0.002 Au 5.78 Ag | None Au 42.8% |
| (2) PROSPECTO - Mexico Au 0.079 Ag 12.0 Mn % 2.1 Cu % 1.1% | 19.7 | 0.9 | 0.004 Au 1.98 Ag | 95.0% Au 83.5% Ag | 18.6 | Nil | 0.050 Au 8.70 Ag | 36.7% Au 27.5% Ag |
| (3) Noranda 2062 Au 0.008 Ag 12.0 Mn % 18.0 Cu % 2.0 | 17.7 | 1.4 | 0.004 Au 0.56 Ag | 50.0% 95.3% | 17.5 | Nil | 0.006 Au 4.40 Ag | 25% 63.3% |
| (4) Guanacevi Mexico Au oz/t 0.020 Ag. oz/t 5.3 Mn % 7.3 | 18.8 | 0.8 | 0.040 Au 0.20 Ag | 80.0% 96.2% | 18.2 | Nil | 0.014 Au 2.80 Ag | 30% 47.2% |
| (5) Cruz de Mayo Mexico Au oz/t 0.012 Ag. oz/t 12.9 Mn % 0.90 | 19.3 | 0.70 | 0.006 Au 2.02 Ag | 50.0% 84.3% | 16.4 | Nil | 0.012 Au 6.22 Ag | Zero 5.8% |
| (6) Duval Corp.-Battle Mountain Au oz/t 0.088 Cu. % 0.3% | 18.0 | 1.0 | 0.004 Au 0.02 Ag | 95.5% 96.0% | 17.2 | Nil | 0.004 Au 0.05 Ag | 95.5% 90.0% |

What is claimed is:

1. In a method for the recovery of precious metals including gold and silver from an ore containing same, comprising lixiviating said precious metals from said ore using an ammonium thiosulfate liquor as the lixiviating agent in the presence of copper, followed by recovering said precious metals from said ammonium thiosulfate liquor, the improvement comprising:
    maintaining the pH of said liquor during lixiviation at a value of at least 7.5 with ammonia, and simultaneously maintaining a sulfite ion concentration of at least 0.05%.

2. A method in accordance with claim 1, wherein said ore is a manganese containing ore and said sulfite ion concentration is maintained at a level of at least 0.1%.

3. A method in accordance with claim 1, wherein said ore contains at least 0.5% manganese and said sulfite ion concentration is maintained at 1-4%.

4. A process in accordance with claim 1, wherein the sulfite ion concentration is maintained by generation in situ from the addition of sulfur dioxide.

5. A method in accordance with claim 1, wherein the temperature is maintained at 40°-60° C.

6. A method in accordance with claim 1, wherein after said recovery of said precious metals, said ammonium thiosulfate liquor is recycled and additional thiosulfate is generated in situ by adding extra sulfite and sulfide, and reacting the same to form the additional thiosulfate.